United States Patent [19]

Blasin

[11] 4,368,916
[45] Jan. 18, 1983

[54] LONGITUDINAL ADJUSTMENT DEVICE FOR THE FOLDING SEAT OF AN AUTOMOBILE

[75] Inventor: Serge Blasin, Le Plessis Robinson, France

[73] Assignee: Regie Nationale des Usines Renault, Boulogne-Billancourt, France

[21] Appl. No.: 164,529

[22] Filed: Jul. 2, 1980

[30] Foreign Application Priority Data

Jul. 4, 1979 [FR] France ............................. 79 17316

[51] Int. Cl.³ .............................................. B60N 1/10
[52] U.S. Cl. ................................ 297/341; 296/65 R; 297/378; 297/383
[58] Field of Search ............... 297/341, 379, 378, 383, 297/355; 296/65 R, 66

[56] References Cited

U.S. PATENT DOCUMENTS

| | | | |
|---|---|---|---|
| 3,292,970 | 12/1966 | Wilson | 296/66 |
| 3,357,737 | 12/1967 | Vettel et al. | 296/66 |
| 3,727,976 | 4/1973 | Lystad | 297/379 |
| 4,015,877 | 4/1977 | Button | 296/65 R |
| 4,052,102 | 10/1977 | Rosenthal | 297/341 |
| 4,124,250 | 11/1978 | Weinich | 297/379 X |

FOREIGN PATENT DOCUMENTS

| | | | |
|---|---|---|---|
| 75594 | 5/1976 | Australia | 297/341 |
| 1465492 | 12/1966 | France . | |
| 2000890 | 12/1969 | France . | |
| 2035153 | 12/1970 | France . | |
| 2419050 | 11/1979 | France | 297/341 |
| 705249 | 3/1954 | United Kingdom . | |
| 872118 | 5/1961 | United Kingdom . | |
| 1450938 | 9/1976 | United Kingdom . | |
| 2009592 | 6/1979 | United Kingdom . | |

Primary Examiner—James T. McCall
Attorney, Agent, or Firm—Oblon, Fisher, Spivak, McClelland & Maier

[57] ABSTRACT

An adjustable back folding seat is disclosed. A connecting rod from the back to the seat carries the axis of folding of the back, and another rod carries a bolt for immobilization of the back in use position. A bar for connecting rods ensures the longitudinal adjustment of the back with respect to the seat.

3 Claims, 9 Drawing Figures

LONGITUDINAL ADJUSTMENT DEVICE FOR THE FOLDING SEAT OF AN AUTOMOBILE

BACKGROUND OF THE INVENTION

1. Field of the Invention

The present invention concerns a longitudinal adjustment device for a folding automobile seat of the type having a longitudinally adjustable back connected to the seat by means of rods, and a locking device to set the back in the desired position of use.

2. Description of the Prior Art

When seats of this type are placed in proximity to the baggage storage area and are separated from said area solely by their backs, it is advantageous to be able to adapt to the storage area needs and and to increase the storage volume by folding one of the seats. When a seat of this type is in the driver's position, it is also advantageous that it adapt to the physiological characteristics of the individual. In both cases, it has been proven advantageous to modify the depth of the seat bed.

SUMMARY OF THE INVENTION

In accordance with the invention, a rod connecting the back to the seat carries the folding axis of the back and another rod carries a bolt for fixing the back in the desired positions of use, while a bar connecting said rods secures the longitudinal position of the back with relation to the seat. Such a device enables longitudinal displacement of the seat back with respect to the stationary seat and folding of the back onto the seat cushion.

The device may be joined to various types of seats. It is particularly suited for seats whose beds are made slidingly integral with the vehicle by means of slides, the movable slide of which is mounted on the seat bed support and the stationary slide is integral with the floor of the vehicle. It is also suitable for conventional seats, in which the front part of the seat bed support carries the upward pivot axis of the seat assembly after folding of the back onto the seat cushion.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
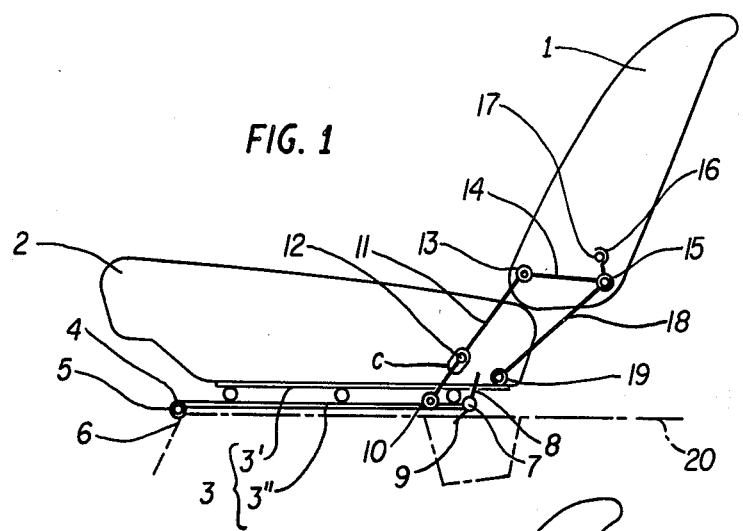
FIG. 1 is an elevation of the seat according to one embodiment of the invention, with the seat shown mounted on slides in a back position.
Figure 2:
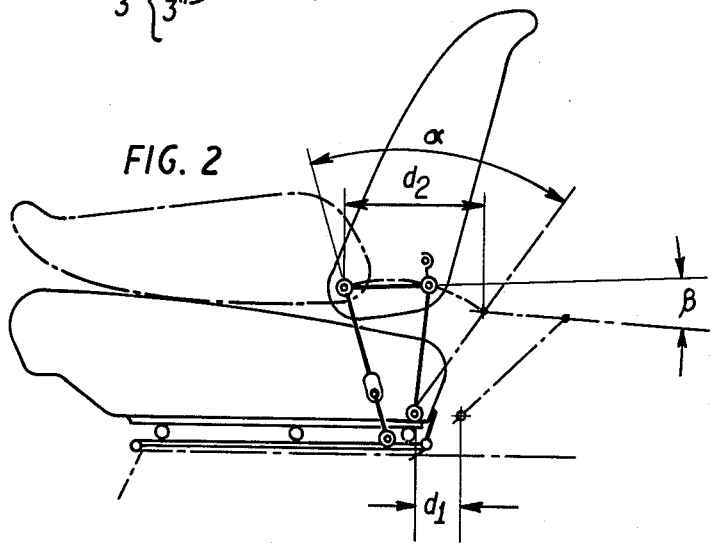
FIG. 2 is an elevation of the seat represented in FIG. 1, with the seat shown in a forward position. This Figure shows the range of adjustment of the back.
Figure 3:
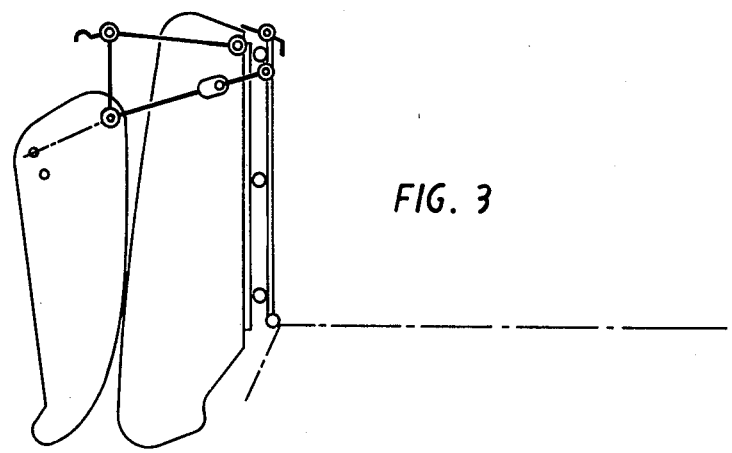
FIG. 3 is an elevation of the seat shown in folded position.

FIGS. 1 through 3 refer to a device enabling continuous displacement of the seat back from front to back and vice versa. The seat bed moves essentially proportionally to the displacement of the back. After having tilted the back over onto the seat bed, one may unbolt the seat base from the floor and tip the seat-back assembly into raised position.

The seat shown is composed of a back 1 and a bed 2. Bed 2 rests on a set of known mutually lockable slides having conjugate sections. The slides may be equipped with a double unbolting control lever enabling control of the front or back of the seat. Such a lever is known from French Pat. No. 2,159,749. Each set of slides is composed of a movable upper slide 3' and a lower slide 3". Upper movable slide 3' is rigidly joined to the base of seat bed 2 and carries the bolting and unbolting mechanism connecting the upper and lower slides.

Each lower slide 3" carries on its forward portion a movable knuckle joint 4, connected by an axis 5 to stationary knuckle portion 6 which is integral with floor 20 of the vehicle. The back part of at least one of the slides 3" carries the axis of rotation 7 of a spring-return bolt 8 which engages a catch 9 affixed to floor 20.

Slides 3" also carry the axis of rotation 10 of a connecting rod 11 from back 1 to bed 2. According to the embodiment shown, connecting rods 11 are located under the side trim of the seat on either side of the latter.

Connecting rod 11 is positively linked to seat bed 2 by means of a control element constructed in the example shown in the form of a slide c which moves with respect to the control element of the seat back during longitudinal displacements of the seat bed. The aforementioned seat back control element consists of an axis 12 integral with seat bed 2. The end of rod 11 opposite the axis of rotation 10 carries the box of an axis 13 for folding seat back 1, said folding axis 13 being integral with the reinforcement of back 1 and located at the base of the latter. Axis 13 is connected to a parallel axis 15, likewise located at the base of the seat back, by a rod or connecting bar 14. Axis 15 constitutes the axis of articulation of a second connecting rod 18, the lower part of which is mounted in rotation about an axis 19, which is longitudinally shifted with respect to axis 10 and integral with the base of seat bed 2 or slide 3'. Finally, axis 15 carries a bolt 16 for immobilizing seat back 1, said immobilization bolt 16 being hooked onto a pin 17 carried by the seat back reinforcement so as to obtain the immobilized position of the seat back. To the immobilization bolt is joined a spring for biasing the bolt onto pin 17.

In the operation of the above described embodiment, the displacement "$d_1$" of cushion 2 is obtained by the user (passenger or individual wishing to load the trunk) acting upon one of the controls for unbolting the slides 3. This displacement results in a rotation $\alpha$ of rod 11 about axis 10, driven by axis 12 connected to seat bed 2. Axis 12 slides in the oblong slide of rod 11 and generates a displacement $d_2$ of axis 13. By means of bar 14, axis 13 drives axis 15, which, by means of lever 14, has consequently rotated rod 18, which is expressed in a translation of seat back 1 and a slight rotation of the latter by an angle $\beta$.

The ratio of the lengths of elements 11, 14 and 18, and the distance between axes 10 and 19, enables variations of the inclination of the seat back which are kept within limits which ensure maximum seat comfort.

If one wishes to tip the seat forward (for carrying bulky objects or access the rear seats), one simply operates bolt 16, which frees pin 17. One may then push the back over onto the seat bed about axis 13 and fold the seat over in order to free the otherwise occupied floor surface.

After having tilted seat back 1 over onto the seat bed, one may activate bolt 8 which releases the securement of the bed on floor 20. Then one may tip the seat forward by rotation about axis 5.

Figure 4:
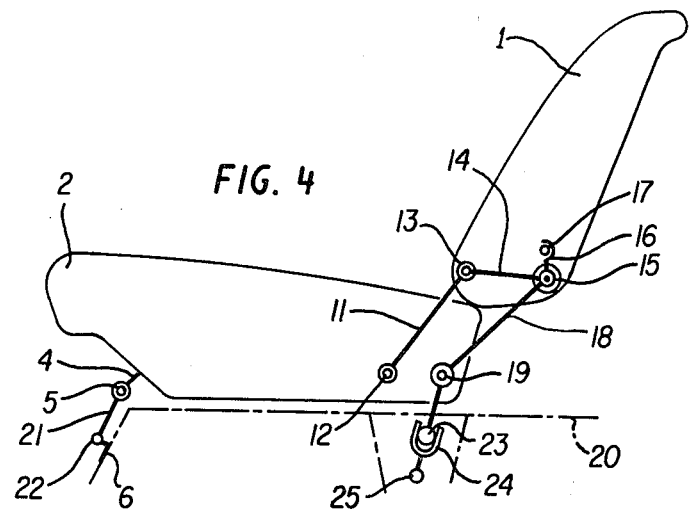
FIGS. 4, 5 and 6 are views showing the seat in the positions of FIGS. 1 through 3 respectively, but according to another embodiment of the invention, with the seat mounted so as to pivot about an axis affixed to the front part of the seat bed support.
Figure 5:
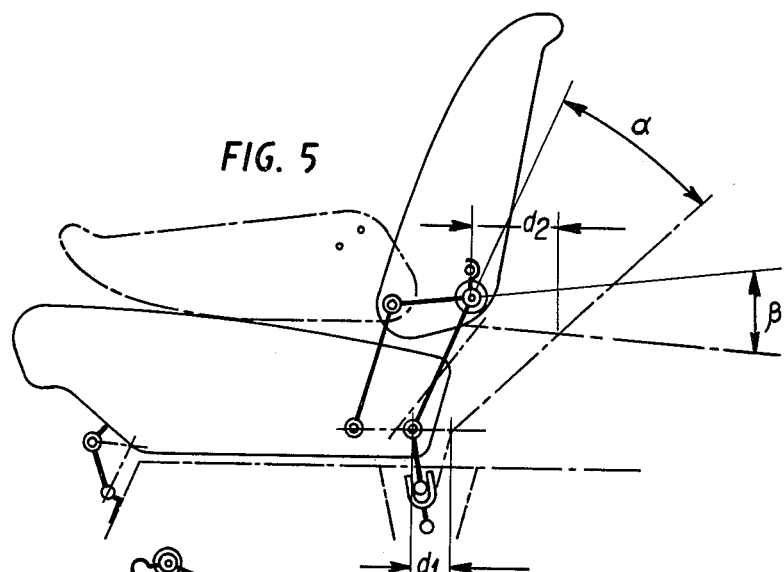
Figure 6:
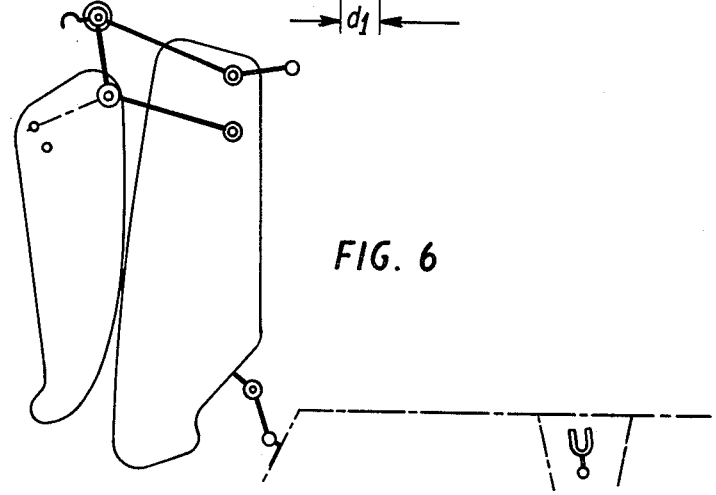

FIGS. 4 to 6 refer to a variant where the seat is not mounted on a set of slides. The adjustment device, located on either side of the median axis of the seat, enables continuous displacement of the seat back from front to back and vice versa. The seat bed, in this movement, is displaced essentially proportionally to the displacement of the seat back. After having tilted the seat back over onto the seat cushion, one may unbolt the base of the seat bed from the floor using a special control and tip the seat assembly into a raised position.

The seat is composed of a back 1 and a bed 2. The latter is articulated at its front portion by two knuckle joints 4 affixed to the base of seat bed 2. Knuckle joints 4 carry an articulation rod 21, which is centered through the axis of articulation 5 engaged in the knuckles. The end of rod 21 carries axis 22, engaged in a knuckle joint 6 affixed to the floor 20 of the vehicle. The posterior part of the seat bed carries an axis 12, about which turns the end of a guide lever 11, which at its other extremity has an articulation yoke mounted to rotate about an axis 13 carried by the base of seat back 1. About axis 13 is articulated a connection bar 14. Bar 14 links axis 13 to a parallel axis 15, likewise carried by the base of the seat back. Axis 15 constitutes the axis of articulation of a second connecting rod 18, the lower part of which is mounted to rotate about an axis 19. As in the previously described embodiment, a spring bolt cooperates with a pin 17 and immobilizes the back. Connection rod 18 is extended beyond axis 19 by a system for locking into floor 20. The locking system consists of any well known conventional lock 24 mounted for articulation about an axis 25 connected to floor 20. Within lock 24 is engaged a bolt 23 mounted at the lower extremity of the connecting rod.

In the operation of the device, displacement $d_1$ of the cushion is obtained by the user after having unbolted elements 14 and 18, either by pushing back seat back 1 or by advancing the cushion. Upon displacement $d_1$, there follows an angular variation of rods 21 and 18 which, through rod 11 and bar 14, displaces and inclines the seat back by amounts $d_2$ and $\beta$.

The ratio of the lengths of elements 11, 14 and 18, and the separation of axes 12 and 19, enable, for a variable displacement $d_1$, inclination of the seat back by a value which one skilled in the art will easily be able to maintain within limits ensuring a maximum of passenger comfort.

As in the preceding arrangement, one may tip the seat back forward. This operation is carried out using immobilization bolt 16, which frees pin 17. The seat back, articulated about axis 13, may then be tilted back as shown in FIG. 5.

In order to fold the seat, after having tipped seat back 1, it suffices to deactivate lock 24 which immobilizes the seat bed to the floor and to tip the seat forward by rotation about axes 22 and 5, by means of articulation rods 21, as shown in FIG. 6. Rods 21 permit reduction of the vertical height of the folded seat by bringing seat bed 2 into contact with the floor.

Figure 7:
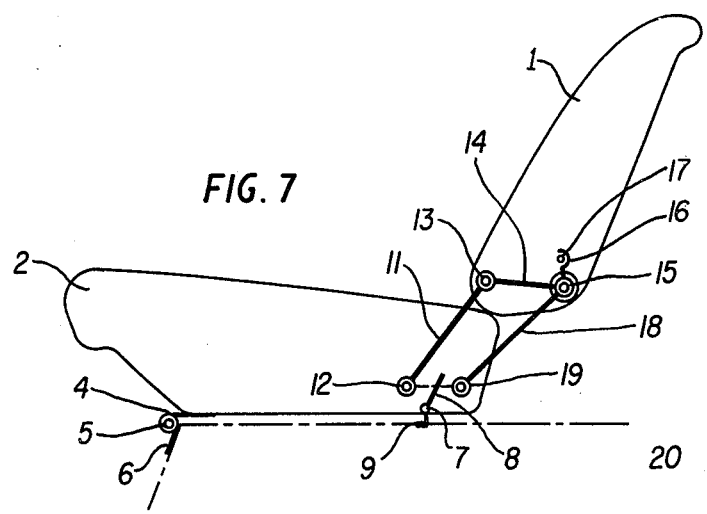
FIGS. 7, 8 and 9 are views showing the seat in the positions of FIGS. 1 through 3 respectively, according to a simplified embodiment of the device.
Figure 8:
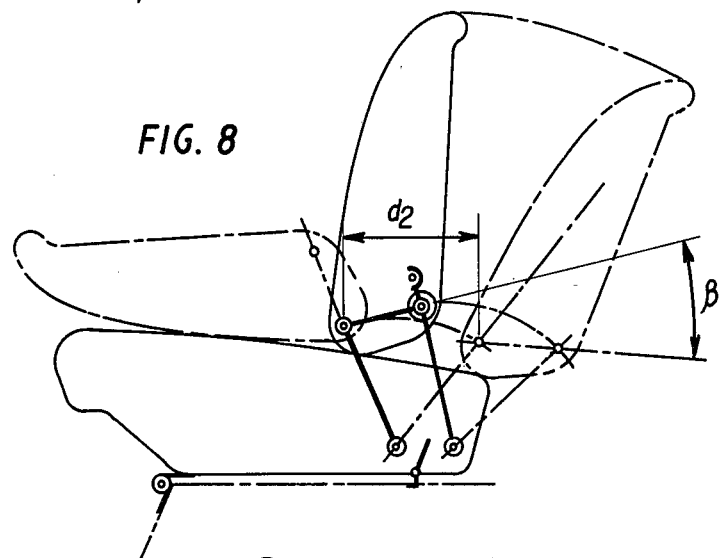
Figure 9:
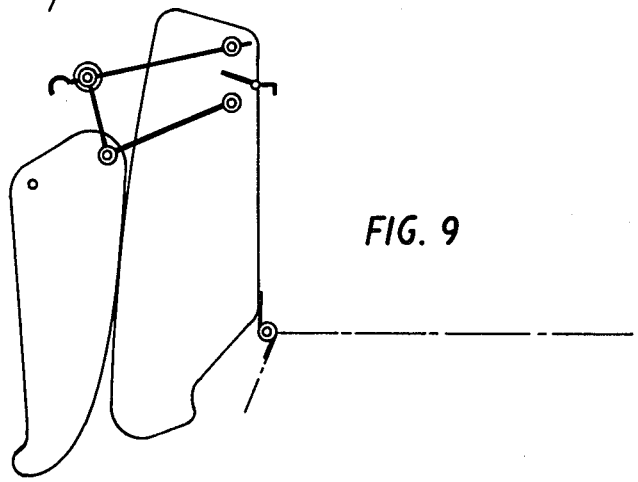

According to the example shown in FIGS. 7 to 9, the seat is composed of a back 1 and bed 2. Seat bed 2 is articulated to floor 20 at its front portion by means of a hinge having axis 5, one knuckle portion 4 of which is affixed to the base of seat bed 2 and the other knuckle portion 6 of which is affixed rigidly to floor 20.

The rear portion of the base of the seat bed carries an axis 12, about which turns a guide rod 11 having at its other end a box articulated about an axis 13 carried by seat back 1.

On axis 13 is also articulated connecting bar 14, the end of which is affixed to an axis 15 carried by the base of seat back 1. Axis 15 carries a rod 18 and an immobilization bolt 16 biased by a control spring onto pin 17, as described with regard to the other Figures. In the embodiment shown, there also reappear elements 13, 18, and 19 described previously.

Acting upon elements 14 and 18 and centered on axis 15, there is a device for locking said elements, controlled by an unlocking lever or control button.

The posterior part of the base of seat bed 2 carries the axis 7 of a spring bolt 8 which hooks into a catch 9 joined to the floor.

Displacement $d_2$ of seat back 1 is obtained after unlocking elements 14 and 18.

The ratio of the lengths of lever arms 11, 14 and 18, and the separation of axes 12 and 19, enable, for a displacement $d_2$ of the seat back, its inclination to be varied by a value $\beta$ which one skilled in the art may easily set within limits assuring maximum passenger comfort.

If one wishes to fold the seat, the operation is performed by freeing pin 17. The seat back, articulated about axis 13, is next pushed over onto the cushion of the seat bed and the seat may be folded more completely so as to free up the maximum amount of space on the floor.

For this last operation, it suffices to have tipped seat back 1 and to have deactivated bolt 9 which holds the seat bed onto the floor, after which one raises the seat forward by rotation about axis 5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for the longitudinal adjustment of a folding automobile seat of the type having a longitudinally adjustable back connected to the seat bed by rods and means for fixing said seat back in use position, comprising:
   at least one first rod having one end pivotally connected to said seat back;
   at least one second rod having one end pivotally connected to a fixing bolt selectively engageable with said seat back; and
   a third rod connected between each said one end of said at least one first rod and said fixing bolt, whereby said rods move said seat back into longitudinal adjustment with respect to said seat bed, wherein said seat is slidingly connected to the body of said automobile by a first slide means fixed to said automobile body and a second slide means engaged with said first slide means and fixed to said seat, and wherein each said first rod is also pivotally connected to said first slide means and each said second rod is pivotally connected to said second slide means, and wherein each said first rod confines an axis fixed to said seat bed.

2. The device of claim 1 wherein the confinement of said axis fixed to said seat bed by each said at least one first rod is accomplished by means slidingly engaging said axis fixed to said seat bed on each said at least one first rod.

3. The device of claim 1 wherein the fixing of said first slide means to said automobile body is by an axis of rotation at the front of said seat bed and a latch means at the back of said seat bed.

* * * * *